United States Patent
Ng et al.

(10) Patent No.: US 7,647,022 B2
(45) Date of Patent: Jan. 12, 2010

(54) METHODS AND SYSTEMS FOR PROXIMITY COMMUNICATION

(75) Inventors: Amy L. Ng, Chicago, IL (US); Arun Sankisa, Chicago, IL (US)

(73) Assignee: Alcatel-Lucent USA Inc., Murray Hill, NJ (US)

(*) Notice: Subject to any disclaimer, the term of this patent is extended or adjusted under 35 U.S.C. 154(b) by 590 days.

(21) Appl. No.: 10/953,740

(22) Filed: Sep. 29, 2004

(65) Prior Publication Data

US 2006/0068703 A1    Mar. 30, 2006

(51) Int. Cl.
H04B 7/00    (2006.01)
H04W 24/00    (2009.01)

(52) U.S. Cl. .................... 455/41.2; 455/456.1

(58) Field of Classification Search ............. 455/41.2, 455/550.1–553.1, 403, 422.1, 426.1, 456.1
See application file for complete search history.

(56) References Cited

U.S. PATENT DOCUMENTS

| | | | |
|---|---|---|---|
| 6,563,427 B2* | 5/2003 | Bero et al. ............. | 340/573.1 |
| 6,628,938 B1* | 9/2003 | Rachabathuni et al. ... | 455/456.3 |
| 6,784,572 B1 | 8/2004 | Backman et al. | |
| 6,957,069 B2 | 10/2005 | Shah et al. | |
| 7,016,673 B2 | 3/2006 | Reddy et al. | |
| 7,162,237 B1 | 1/2007 | Silver et al. | |
| 2002/0028674 A1 | 3/2002 | Slettengrenn et al. | |
| 2002/0068592 A1 | 6/2002 | Hutcheson et al. | |
| 2002/0122410 A1* | 9/2002 | Kulikov et al. .......... | 370/349 |
| 2002/0131445 A1 | 9/2002 | Skubic et al. | |
| 2003/0100326 A1* | 5/2003 | Grube et al. ............ | 455/515 |
| 2003/0149527 A1 | 8/2003 | Sikila | |
| 2004/0023652 A1* | 2/2004 | Shah et al. ............ | 455/426.2 |
| 2004/0034776 A1 | 2/2004 | Fernando et al. | |
| 2004/0127214 A1 | 7/2004 | Reddy et al. | |
| 2004/0147223 A1 | 7/2004 | Cho | |
| 2004/0172440 A1 | 9/2004 | Nakajima | |
| 2004/0230373 A1 | 11/2004 | Tzamaloukas | |
| 2005/0032527 A1 | 2/2005 | Sheha et al. | |
| 2005/0090201 A1* | 4/2005 | Lengies et al. ............ | 455/41.2 |
| 2005/0111383 A1 | 5/2005 | Grob et al. | |
| 2005/0143095 A1 | 6/2005 | Jacob | |

(Continued)

FOREIGN PATENT DOCUMENTS

WO    WO 03084146 A1 * 10/2003

OTHER PUBLICATIONS

PCT Publication No. WO 03/084146 A1, Oct. 9, 2003.*

(Continued)

*Primary Examiner*—Quochien B Vuong
(74) *Attorney, Agent, or Firm*—Duft Bornsen & Fishman LLP

(57) ABSTRACT

Methods and systems to provide proximity based communication between users of proximity communication devices ("PCD"). A localized communication network is established by peer-to-peer communication between PCDs. Each PCD communicates with other PCDs in a localized, peer-to-peer network structure. Each PCD is identified to other PCDs in its own localized area by its geographical position (i.e., its relative proximity to each other PCD). A user may therefore establish communications with another user based upon the other user's proximity or location relative to the first user's PCD rather than a fixed ID code such as a phone number or address. No centralized server or telephony network system is required for each PCD to communicate with another PCD. Well known protocols for call connection may be adapted for use in establishing, operating, and terminating connections between PCDs.

20 Claims, 8 Drawing Sheets

U.S. PATENT DOCUMENTS

2005/0181726 A1* 8/2005 Gottlieb et al. ............ 455/41.2
2005/0220106 A1 10/2005 Raverdy
2005/0221813 A1 10/2005 Rajahalme
2006/0068703 A1 3/2006 Ng et al.

OTHER PUBLICATIONS

Yahoo! India News: Technology. Wanted: new friend, must have Bluetooth. [online]. Jun. 24, 2004 [retrieved Sep. 29, 2004], Retrieved from the Internet: <URL: http://in.tech.yahoo.com/040624/137/2e8ya.html>.

IEEE Spectrum Online. Robinson, Bruce T., Who goes there? How the U.S. Army's new satellite tracking system helped avert friendly fire and lift the fog of war in Iraq. Oct. 2003 [online], [retrieved Sep. 29, 2004], Retrieved from the Internet: <URL: http://www.spectrum.ieee.org/spectrum/oct03/features/mili.html>.

* cited by examiner

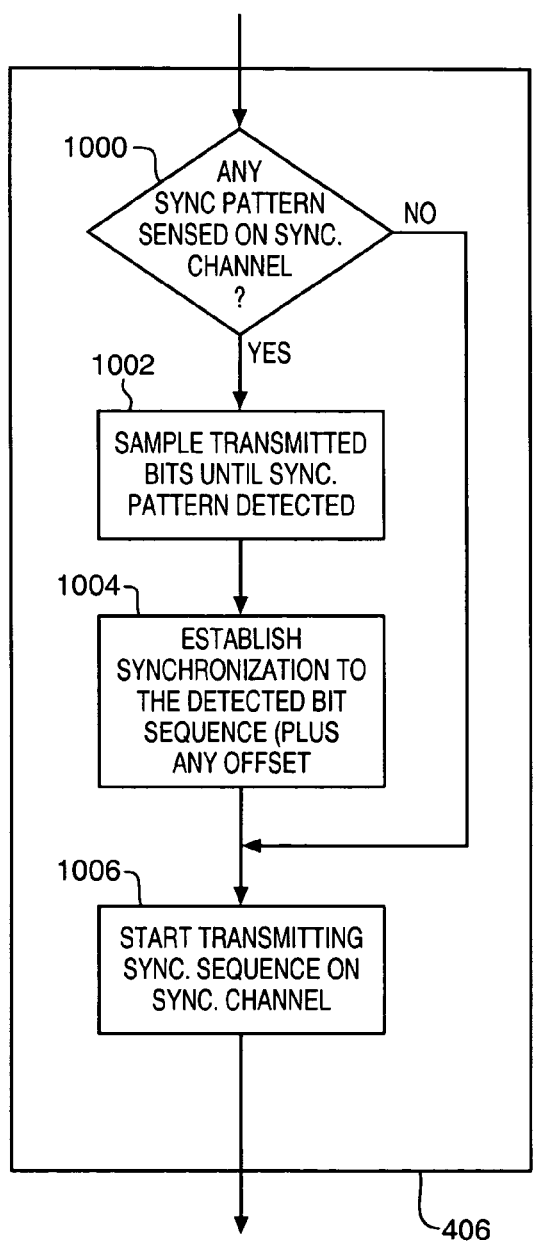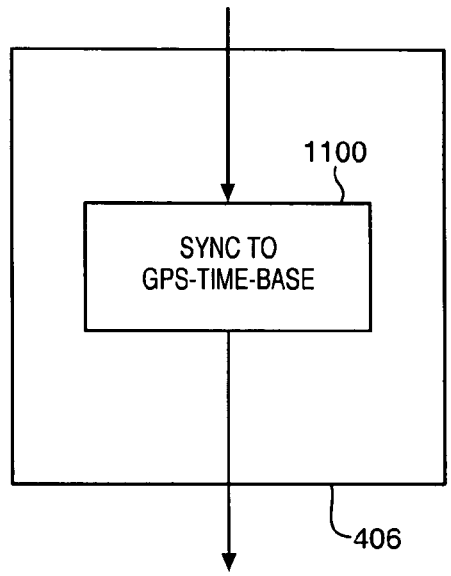

METHODS AND SYSTEMS FOR PROXIMITY COMMUNICATION

BACKGROUND OF THE INVENTION

1. Field of the Invention

The invention relates generally to communication systems and more specifically relates to methods and systems for communicating among communication devices identified by physical location and/or relative proximity.

2. Statement of the Problem

Numerous types of communication systems are known, commercially available and particularly suited to one or another particular application. For example, standard "landline" telephony networks permit a user to establish communications through a vast switched network to virtually any other point on the globe having similar landline communication systems. Or, for example, cellular telephony utilizes frequency transceivers and related protocols to couple an end user's cellular telephone to a nearby cellular tower. Cellular tower base stations forward digitized voice data, analog voice data or other digital data to other towers as a cell phone moves out of range and also forwards user data for coupling to standard landline based switched telephony systems. Thus cellular telephone users may connect with any landline telephone equipment or other cellular telephone users (coupled, in turn, to landline switched telephone networks through respective cell tower base stations).

In general, all such telephony communication systems are limited in two important respects. First, end user devices may communicate with one another only via a centralized server or network system (e.g., via respective cellular base stations and/or switched telephony networks). Landline telephony systems provide a network of switching devices to establish circuits between two or more end user telephone devices (or other data or voice communication devices). Cellular base stations atop cellular towers are required for cellular telephone users to establish connections with land based telephony systems or other cellular telephone users. If these centralized servers or networks are for any reason unavailable, no communication may be established between end users of the communication devices.

Secondly, to establish a call connection between two end user devices, a telephone number or other indicia (e.g., network address, ID, etc.) must be supplied to identify the other device with which communications are to be established. This indicia is static regardless of where the user is located and is required information to establish a call connection.

Radio frequency based communication systems such as citizens band ("CB") radios. or simple "walkie talkie" radio devices do not require a centralized server or communication node but rather communicate directly from one end user's radio device to other user radio devices. However, radio communication systems do not generally provided for establishing a specific point-to-point call between one end user radio device and one or more particular, identified other end user radio devices. Rather, radio communication systems generally operate in a broadcast mode such that all users whose transceivers tuned to a particular frequency or channel receive every transmission on that frequency or "channel". No private communication links may be established under such typical radio based communication systems. Although transmissions may be encrypted or scrambled, any radio device equipped with the proper decryption code and within transmission range can receive and decrypt the transmissions. No specific user or device may be identified in typical radio frequency based communication systems. Further, radio based communication systems generally do not provide for any protocol to establish the beginning of a call connection and the termination of an established connection. Radio communications are merely established by beginning transmission of a broadcast signal and ended when a user chooses to cease termination. Another weakness of radio based communication systems arises in that user data (voice or other data) is not encoded for spread spectrum high speed communications.

In a number of communication applications, it may be desirable or required to ensure continued communication capabilities without having to rely on a centralized server/network or communication tower. In an emergency scene response communication application or in a military combat communication application, it is important that the communication systems operate despite loss or failure of a central server/network or cell tower base stations. A communication system based on a centralized server/network or a cellular base station tower may be easily disabled by eliminating the central server or tower.

Further, it may be beneficial in many communication applications to permit establishment of a call connection (initiation of a call) to a specific device identified based on its geographical location (i.e., its physical proximity to the initiator of the call). Still further, in addition to location attributes to identify another communication device, it may be useful to identify a desired device for communication based upon other attributes of the user or the communication device.

For example, in a military context, it may be useful for military personnel in combat to be able to communicate with another soldier or other personnel based upon physical proximity to the initiator of the call. In other words, call "the closest reinforcements". There may be no simple way to identify a phone number or other identifying address for the "nearest" personnel. Or, for example, it may be beneficial to initiate a call to the nearest personnel having particular attribute capabilities. In other words, call the nearest "EMT" personnel or call the nearest soldiers "with heavy artillery" or call the nearest "medic", etc. Presently known communication systems do not provide simple techniques for identifying such personnel or attributes of another communication device and do not provide mechanisms to directly set up communications with such identified devices.

Similarly, in another exemplary application of communication systems, first responders in a rescue or emergency operation such as fire fighters, emergency medical technicians, police, etc., may desire communication systems that locate the nearest personnel for assistance or the nearest personnel with particular capabilities. Similar to military applications as noted above, rescue or emergency operations in the context of a disaster such as earthquakes or the collapse of a building may be significantly hindered if a central server or communication tower is disabled by the disaster they seek to address.

It is evident from the above discussion that a need exists for an improved communication architecture providing mobility, reliability and location oriented identification of communication devices and users.

SUMMARY OF THE SOLUTION

The invention solves the above problems and other problems with methods and systems for proximity based communications. Proximity based communication systems and methods in accordance with features and aspects hereof may utilize radio frequency or other wireless transmission media and techniques to permit peer-to-peer communication between suitable proximity communication devices. Features and aspects hereof do not depend upon a centralized server/network or cellular base station towers that may be disabled. Further, features and aspects hereof do not require a user to identify the recipient of an initiated call by a phone number or other address indicia. Rather, the peer-to-peer proximity communication devices and methods hereof permit establishment of a call connection based principally upon geographical location (i.e., based upon proximity to the proximity communication device ("PCD") of the call initiator. Other features and aspects hereof permit location information for each PCD to be associated with other attribute data such that the recipient of an initiated phone call may be identified by proximity to the call initiator in combination with other attribute information. Still other features and aspects hereof combine proximity communication features within a PCD with standard cellular or other wireless communication protocols to permit both proximity communication capabilities and other prior radio or telephony communication protocols.

A first feature hereof provides a system for proximity communication comprising: a plurality of proximity communication devices ("PCD") wherein each PCD comprises: a locator to determine the geographic location of said each PCD; and a wireless transceiver for exchanging information between said each PCD with other PCDs wherein the information exchanged includes location of each of said plurality of PCDs and wherein the information exchanged further includes user data, wherein said each PCD is adapted to establish a connection with an identified PCD of said other PCDs based on the location of said identified PCD.

Another aspect hereof further provides that the locator is a GPS locator.

Another aspect hereof further provides that the location is an absolute location including longitude and latitude.

Another aspect hereof further provides that the location is a relative location locating said each PCD relative to a reference point.

Another aspect hereof further provides that the location is dynamic and wherein the current location of each PCD is periodically exchanged among all the PCDs Another aspect hereof further provides that the location is used by said each PCD to determine the relative proximity of each PCD to each other PCD of the plurality of PCDs and wherein said each PCD is further adapted to establish a connection with one or more identified PCDs based on the relative proximity of said each PCD to said each other PCD.

Another aspect hereof further provides that the exchanged information includes attributes of each of said other PCDs and wherein said each PCD is further adapted to establish a connection with said identified PCD based on the attributes of said identified PCD.

Another aspect hereof further provides that the user data includes voice data and non-voice data.

Another aspect hereof further provides that at least one PCD of the plurality of PCDs further includes: a wireless telephonic transceiver to provide connectivity to a telephone network in addition to connectivity among said plurality of PCDs.

Another aspect hereof further provides that the telephone network is a cellular telephone network.

Another feature provides a method for proximity based communication comprising: synchronizing wireless communication among a plurality of proximity communication devices ("PCD"); generating a first unique code associated with each of the plurality of PCDs; determining the initial location associated with each of the plurality of PCDs; broadcasting the first unique code and the initial location associated with each of the plurality of PCDs from each PCD to all other PCDs; and establishing at least one call connection between a first PCD and a second PCD based upon the initial location information exchanged between the first PCD and the second PCD.

Another aspect hereof further provides for: periodically resynchronizing the wireless communication among the plurality of PCDs.

Another aspect hereof further provides for: periodically determining a current location associated with each of the plurality of PCDs; and broadcasting the current location associated with each PCD from each PCD to all other PCDs.

Another aspect hereof further provides that the step of establishing further comprises: establishing at least one call connection from the first PCD to the second PCD based upon the initial location information or based upon the current location information exchanged between the first PCD and the second PCD.

Another aspect hereof further provides that the step of establishing further comprises: selecting the second PCD within the first PCD based upon the initial location information or based upon the current location information; sending a connection request from the first PCD to the second PCD wherein the connection request is encoded using the first unique code associated with the second PCD and wherein the connection request includes parameters of the desired connection; receiving the connection request within the second PCD; and establishing the requested connection in accordance with the parameters included in the received connection request.

Another aspect hereof further provides for: responsive to establishment of the requested connection, exchanging scrambled information between the first PCD and the second PCD where the scrambled information is encoded using scrambling key information exchanged between the first PCD and the second PCD in establishing the requested connection.

Another aspect hereof further provides for: generating a PCD ID for each PCD; and generating said scrambling key information, wherein the step of broadcasting further comprises: broadcasting the PCD ID and scrambling key information for each PCD from said each PCD to all other PCDs.

Another aspect hereof further provides for: verifying the uniqueness of each PCD ID received in each PCD in response to the broadcasting; and responsive to detecting a non-unique PCD ID by operation of the step of verifying, performing the steps of: regenerating an alternate PCD ID associated with the particular PCD that detected the non-unique PCD ID; and re-broadcasting the alternate PCD ID for the particular PCD from the particular PCD to all other PCDs.

Another aspect hereof further provides that the step of establishing further comprises: establishing multiple call connections between a first PCD and multiple other PCDs, wherein the method further comprises: responsive to establishment of the multiple call connections, duplicating the exchange of information between the first PCD and any one of the multiple other PCDs to exchange the same information between the first PCD and each of the multiple PCDs, wherein each of the multiple call connections is encoded using a distinct scrambling code.

Another feature hereof provides a method operable in a proximity communication device ("PCD") having a GPS locator device and having a wireless transceiver and having a user interface element to interact with a user, a method comprising: receiving location information from other PCDs using the wireless transceiver; presenting the received location information to a user on the user interface element; receiving user input from the user input element indicate one or more other PCDs selected by the user based upon the presented location information; establishing a call connection with each of the one or more other PCDs using the wireless transceiver; and exchanging substantially the same information with each of the one or more other PCDs using the wireless transceiver.

BRIEF DESCRIPTION OF THE DRAWINGS

The same reference number represents the same element on all drawings.

FIG. 10 is a flowchart providing additional details of an exemplary channel synchronization protocol in accordance with features and aspects hereof.

FIG. 11 is a flowchart providing additional details of another exemplary channel synchronization protocol in accordance with features and aspects hereof.

DETAILED DESCRIPTION

For the purpose of teaching inventive principles in the following discussion, some conventional aspects of the invention have been simplified or omitted. Those skilled in the art will appreciate variations from these embodiments that fall within the scope of the invention. Those skilled in the art will appreciate that the features and aspects described below can be combined in various ways to form multiple variations of the invention. As a result, the invention is not limited to the specific embodiments described below, but only by the claims that follow and their equivalents.

Figure 1:
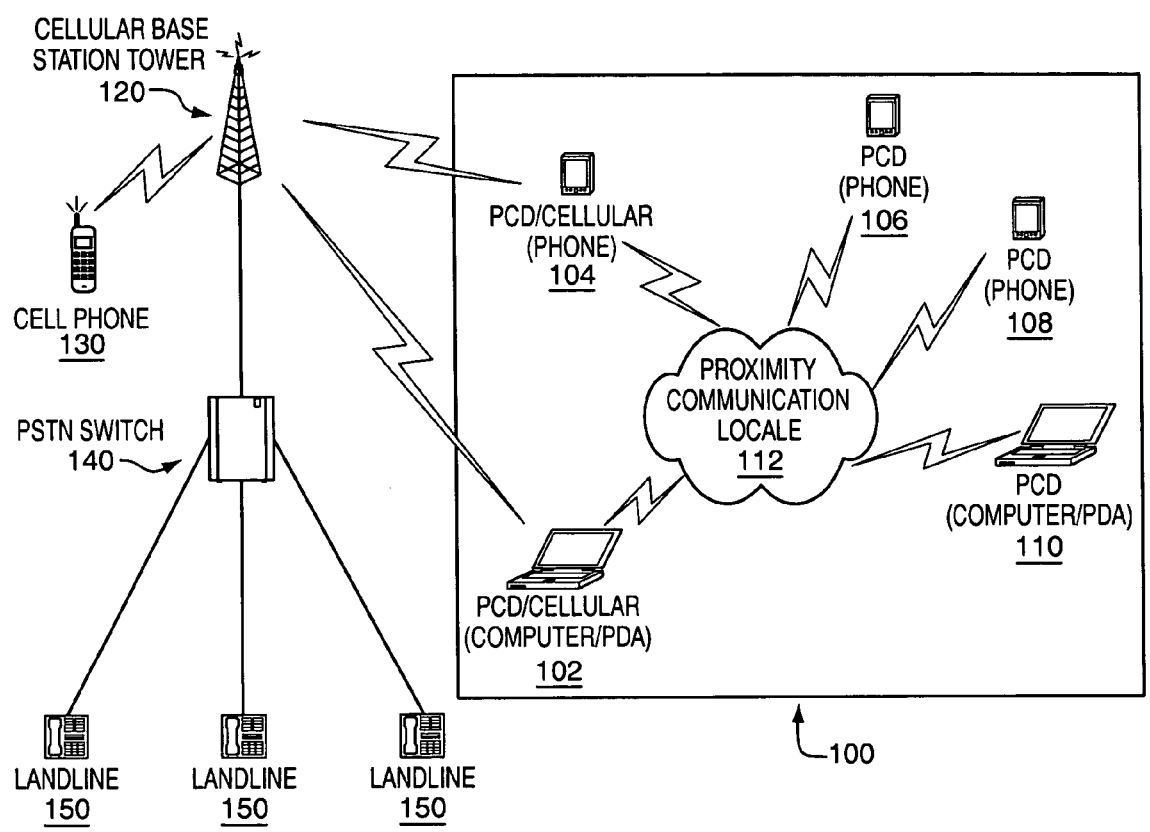
FIG. 1 is a block diagram of a proximity communication system embodying features and aspects hereof.

FIG. 1 is a block diagram of a proximity communication system 100 providing features and aspects hereof. System 100 may comprise any number of proximity communication devices. PCDs 104, 106, and 108 of FIG. 1 each represent proximity communication devices providing telephonic features for a user. Telephonic features as used herein refers to communication of voice and non-voice data between two appropriately configured telephonic PCDs. PCD 106 and 108 are configured to provide such telephonic features within the context of proximity communication system 100. By contrast, PCD 104 provides telephonic functionality within the context of proximity communication system 100 and also provides features to permit telephonic communication through well-known cellular telephony systems. PCD 104 therefore provides dual functionality to permit communication both in the context of proximity communication system 100 and standard cellular telephony through cellular base station tower 120.

In like manner, proximity communication system 100 may include PCD devices offering data processing and computing functionality. PCD 102 and 110 represent computing devices adapted for communication within proximity communication system 100. PCD 110 is adapted exclusively for communication within proximity communication system 100 while PCD 102 represents a dual capable computing device operable to communicate in a proximity communication system 100 as well as in a cellular communication structure such as cellular base station tower 120. PCD devices 102 and 110 are exemplary of devices that generally exchange non-voice user data. Laptop/notebook computers and PDAs are examples of such devices that primarily exchange non-voice related user data. Those of ordinary skill in the art will recognize the numerous equivalent devices capable of providing only voice data exchange, only non-voice data exchange or both voice and non-voice data exchange. For example, modem cellular telephonic devices are capable of exchanging both voice data and non-voice data with other similarly equipped devices. In like manner, PDAs or computers may exchange both non-voice data and voice data. The distinctions between such devices has faded in importance and is at times irrelevant. Thus, those of ordinary skill and the art will recognize that any number and any variety of PCD capable devices may be utilized within exemplary proximity communication system 100.

Proximity communication system 100 permits identification of each PCD principally by its present location as distinct from a fixed telephone number or other fixed address indicia. As discussed further herein below, each PCD in proximity communication system 100 is capable of operating in a peer-to-peer mode to communicate with any other PCD in system 100. No centralized server or cellular base station is required for operation of proximity communication system 100. Rather, each PCD is made aware of all other PCDs in proximity communication system 100 and may establish private communication channels with one or more other PCDs in system 100. Each PCD is identified principally by its present location relative to each other PCD. As discussed further herein below, GPS or other absolute location information may be used to establish an absolute location which may then be converted to relative location information to locate a PCD relative to other PCDs.

Since each PCD establishes a peer-to-peer connection with one or more other PCD, there is no central server/network required to establish communication. Proximity communication locale 112 is not a central server or network but rather simply represents any geographical area defined by the transmission and reception range limitations of the particular wireless transceiver technologies utilized within PCDs 102 through 110 of system 100.

All PCDs 102 through 110 within system 100 exchange information during initialization and periodically thereafter to indicate their present physical position. The present physical position of a PCD may be determined by the PCD, for example, by global positioning system ("GPS") technology embedded within each PCD. During initialization, each PCD determines its absolute location based upon the GPS information and communicates it (broadcasts it) to all other PCDs within the range of proximity communication locale 112. Each PCD therefore also receives broadcast location information from each other PCD so that it may determine the relative position for each of the other PCDs in the system 100. Such relative position information may therefore be used by a user to select one or more other PCDs with which a communication channel is to be established (i.e., with which a call connection is to be established).

In accordance with features and aspects hereof, each PCD is mobile and may freely move about anywhere within the range of proximity communication locale 112. Further, a particular PCD may be identified by a user from another PCD based on location information only rather than requiring apriori knowledge of a telephone number or other address indicia. Those of ordinary skill in the art will also recognize that other identification information, in addition to present location, may be exchanged between the PCDs of system 100. Therefore, in accordance with features and aspects hereof, a user may also select one or more other PCDs with which to establish a call connection based on present location of the other PCDs and other attributes identified and associated with each PCD. For example, such other attributes may include capabilities associated with the location or available at the location of the PCD, name or other indicia associated with a user of another PCD, etc.

By contrast to proximity communication system 100, standard telephonic communication systems such as PSTN switch 140 and associated landline telephones 150 are restricted in their mobility and require identification of each telephone by a particular telephone number regardless of its present location. Cellular telephony systems represented as cell phone 130 coupled by wireless communication to cellular base station tower 120 provide mobility as compared to land line telephone systems but none the less require identification of a particular cell phone by its telephone number regardless of its present physical location. Landline telephony systems and cellular telephony systems also both require a centralized server or cell tower base station to permit communication between two landline telephones or between a cell phone and any other telephone device. Failure of the server/network or the cellular base station may render all associated telephone equipment unusable.

Proximity communication system 100 may utilize any of several well known, commercially available, wireless communication protocols and standards. For example, the 3rd Generation Partnership Project ("3GPP") defines wireless transmission standards and associated protocols for establishing connections and associated channels and also defines a framework for the interconnection of the various protocols. For example, in accordance with 3GPP standards, PCDs may use spread spectrum encoding techniques to multiplex a number of logical channels of data on a common carrier frequency band. Code division multiple access ("CDMA") encoding techniques are one form of spread spectrum encoding and may be applied in PCDs to permit multiplexing of a variety of logical channels over a single, low power radio frequency carrier.

As will be discussed further herein below, such spread spectrum communication techniques permit a large number of logical channels to be defined within a single frequency band for radio frequency ("RF") transmissions. CDMA spread spectrum techniques generally define each channel by a digital code value used to encode (to spread) the data for a corresponding channel within a transmitted bitstream. The superposition of a plurality of such CDMA spread spectrum signal channels helps reduce the potential for intentional interference or eavesdropping because the superposition of multiple such channel signals results in a low power signal appearing virtually indistinguishable from background noise in the transmission medium. Only by knowing the specific code word for a particular logical channel can a receiver effectively isolate the intended channel data from the other superposed signals making up background noise relative to the desired channel. Such spread spectrum techniques and standards defined by 3GPP standards are well known to those of ordinary skill in the art and readily available for commercial use.

One particular feature of 3GPP standards useful in the proximity communication system features and aspects hereof derives from the definition of two forms or phases of encoding. A first form or phase of encoding is the channellization or channel separation encoding to effectuate the spread spectrum modulation of multiple logical channels multiplexed in a single frequency band. A second form or phase of encoding is referred to as scrambling or source separation in the context of 3GPP. Scrambling codes or source separation codes are used to define dedicated channels between a particular pair of PCDs that have an established call connection. The scrambling code defines such dedicated channels and, in conjunction with other secure communication techniques helps to further reduce potential for inadvertent or intentional eavesdropping or capture of transmitted data.

Still another aspect of 3GPP wireless standards useful in the context of a proximity communication system derives from the use of time division duplex or frequency division duplex to further multiplex information transmitted over a logical spread spectrum channel. Time division duplex ("TDD") or frequency division duplex ("FDD") paradigms may be useful in the context of PCD communication for segmenting full duplex uplink and downlink transmissions.

Those of ordinary skill in the art will recognize a wide variety of equivalent modulation and multiplexing techniques for providing wireless communications useful in the context of proximity communication features and aspects hereof.

Figure 2:
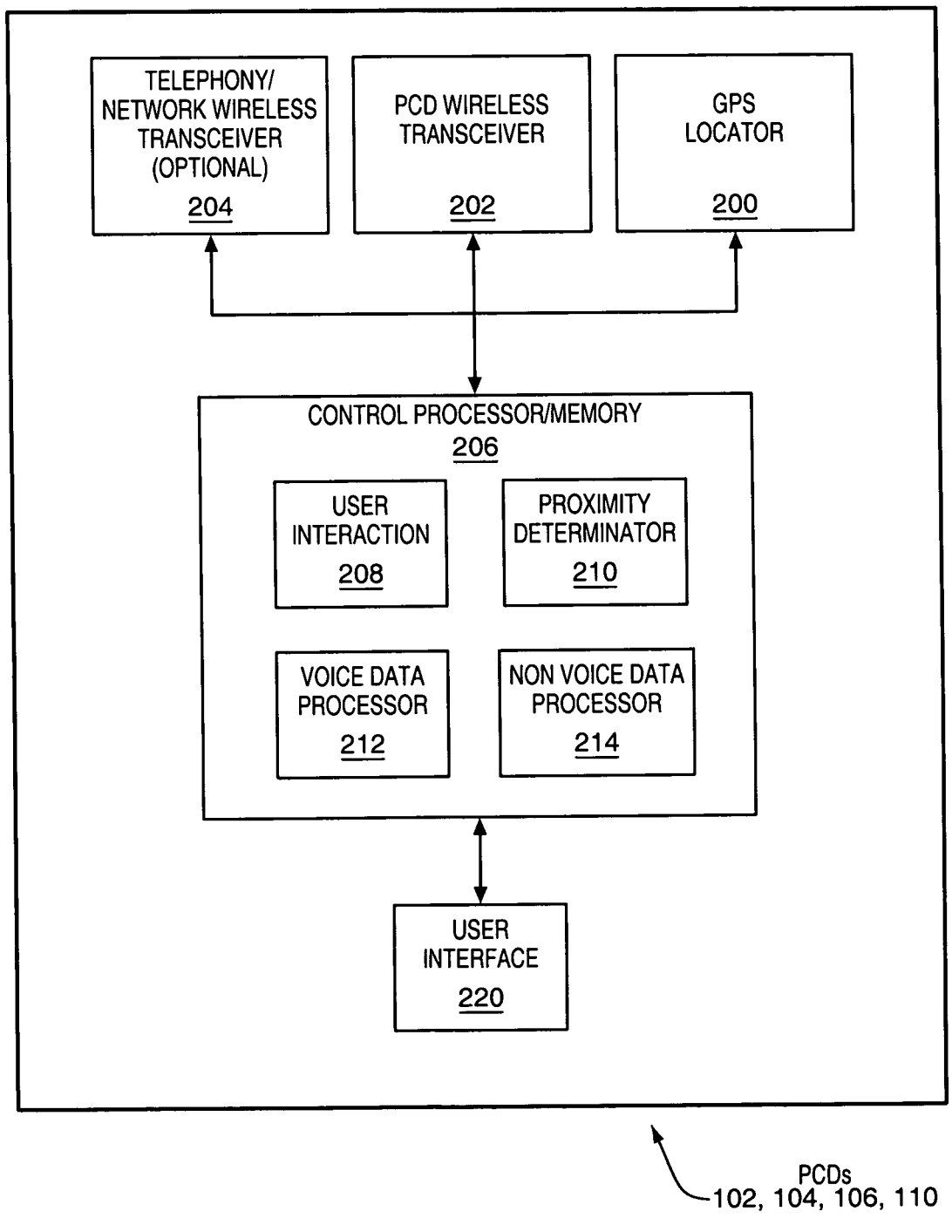
FIG. 2 is a block diagram of an exemplary proximity communication device in accordance with features and aspects hereof.

FIG. 2 is a block diagram describing an exemplary embodiment of a PCD. As generally noted above, a PCD may be any device that provides voice data exchange and/or non-voice data exchange utilizing peer-to-peer communication protocols in accordance with features and aspects hereof. An exemplary PCD (102-110 of FIG. 1) includes a GPS locator element 200 or other equivalent location determination components. GPS locator 200 is operable to determine the present absolute location of the PCD relative to the globe or relative to any other fixed point of reference defined by the specific locator technology. Devices and methods associated with such a GPS locator or other locating technologies are readily available and well known to those of ordinary skill in the art.

An exemplary PCD also includes a wireless transceiver element 202 capable of transmitting and receiving data in accordance with the protocols and standards adopted for a particular proximity communication system. PCD protocols and standards may utilize any appropriate wireless communication modulation and protocol standards. Although a simple embodiment of such a dual function PCD may separate the cellular telephony communications in a different frequency band than that used for proximity communications, it may also be feasible to integrate the two communication systems in a common frequency band with separation based upon logical channel definitions.

An exemplary PCD may optionally include a cellular telephony or computer network wireless transceiver element 204 to permit dual functionality of the PCD both for use in the context of a proximity communication system and for use in other wireless communication applications such as wireless computing networks and cellular telephony. Such a dual purpose PCD may therefore allow communications both within a proximity communication system and in conjunction with other prior communication structures.

User interface 220 provides for presenting information to a user and for receiving user input. For example, an LCD or other display device may be included within user interface 220 for presenting information regarding its PCD and other PCDs within the proximity communication system. User interface 220 may include touch screens, pointer devices, voice input functions, and other well-known user interface functions and elements may also provide structure and functionality to receive the user input. For example, in a proximity communication system in accordance with features and aspects hereof, each PCD is identified to a user of another PCD by, at least, its relative location to the user's PCD. Such location information may be presented to a user, for example, by an icon or other graphical representation of each other PCD located on an LCD screen in a manner indicative of the devices relative location with respect to the users PCD. Further, a user may select one or more such other PCDs with which to establish a call connection through use of user input devices such as a touch screen, pointer or other well-known user input functions and devices.

Control processor/memory 206 provides overall control of the PCD through a number of functional elements including, for example, user interaction element 208, proximity determinator 210, voice data processor 212, and non-voice data processor 214. Numerous other control functions will be readily apparent to those of ordinary skill in the art. The representative functions are therefore intended merely as exemplary of significant aspects in operation of a PCD.

Control processor/memory 206 may be any suitable general or special purpose processor and associated program and data memory for storing and executing instructions to provide the depicted, exemplary functions (208-214) and other functions and features useful for wireless communication management. User interaction element 208 represents programmed instructions or other processing elements to interact with user interface element 220 providing output information to a user and receiving user input. Proximity determinator element 210 represents programmed instructions or other processing elements to interact with GPS locator 200 to determine the PCD's present location and to interact with information received through wireless transceiver 202 representing location information of other PCDs in the system. Proximity determinator 210 therefore may determine the relative position of each other PCD relative to each user's PCD. Voice data processor 212 represents programmed instructions or other processing elements to transmit and receive human voice digitized information. The most common application of PCDs in a proximity communication system is to exchange voice information such as is common in telephony systems. Non-voice data processor element 214 represents programmed instructions or other processing elements to transmit and receive non-voice related digital data. PCDs including PDA or general purpose computing functionality may frequently exchange non-voice data while PCD elements providing primarily telephonic features may principally exchange voice data in their operation. However, as noted above, each device may be capable of exchanging both voice and non-voice data.

Those of ordinary skill in the art will readily recognize numerous equivalent architectures within the scope of the attached claims for components within a PCD. Those not adapted to provide the features and aspects of the present invention, various functional elements of a PCD are generally commercially available and well known to those of ordinary skill in the art. For example, GPS locator 200, wireless transceiver 202, telephony transceiver 204, user interface 220 and processor 206 are well known commercially available components. Further, it will be recognized that numerous other functional elements may be present in an equivalent architecture to provide the above and other features and aspects.

Figure 3:
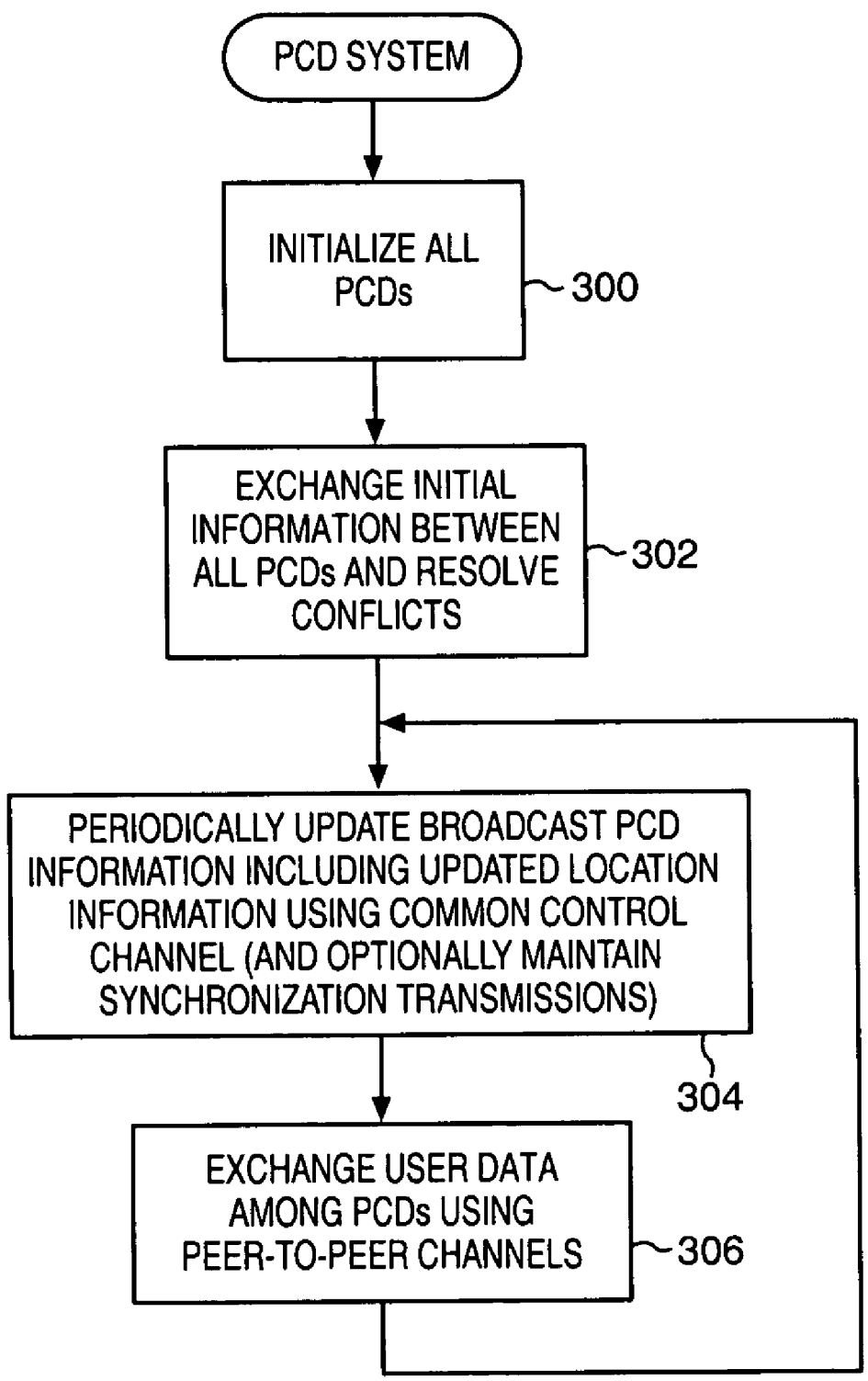
FIG. 3 is a flowchart describing exemplary operation of a proximity communication system as in FIG. 1 operable in accordance with features and aspects hereof.

FIG. 3 is a flowchart describing the overall operation of an exemplary proximity communication system. Element 300 represents processing within each PCD of the proximity communication system to initialize the PCD. In general, initialization of each PCD involves determining its location using GPS components and techniques, generating a unique ID for each PCD to be used in protocol exchanges, generating spread spectrum channellization and scrambling codes for each PCD, etc. Element 302 begins listening and broadcasting to exchange initial information among the PCDs initially within the proximity communication system. In addition, element 302 resolves conflicts between PCDs that coincidentally selected an identical unique ID code. Resolution of such conflicts may be performed in accordance with any of several well-known techniques. For example, each PCD that detects a conflict may randomly select a new ID that does not conflict with any other IDs in the received broadcast information. As each PCD listens for information being broadcast from the other PCDs it builds a table with of information regarding each PCD in the proximity communication system. Further details of initialization of each PCD are provided herein below with respect to FIG. 4.

New PCDs may periodically join the proximity communication system or may drop out of the proximity communication system as new users arrive and depart the locale in which the proximity communication system is operating. Element 304 therefore represents processing to periodically update the PCD information for each PCD in the proximity communication system. The periodically updated information to be broadcast may include, for example, an updated current location for each PCD, the unique ID for each PCD, spreading and scrambling code values, etc. The updated information may be periodically broadcast over a control channel such that every PCD may receive the information by listening to the same control channel.

In addition to periodically updating information exchanged between the various PCDs, in element 304 each PCD performs processing to maintain synchronization with the control channel used for broadcasting information as well as for initially establishing desired call connections. As discussed below, numerous approaches may be employed to establish and maintain synchronization among the plurality of PCDs.

Element 306 then proceeds with normal operation of the system for exchange of user data among two or more PCDs these using the peer-to-peer channels defined in accordance with features and aspects hereof. After some period of time exchanging user data or in response to receipt of new broadcast information from another PCD, processing continues looping back to element 304 to periodically update the PCD information exchanged between the various PCDs of the proximity communication system.

Figure 4:
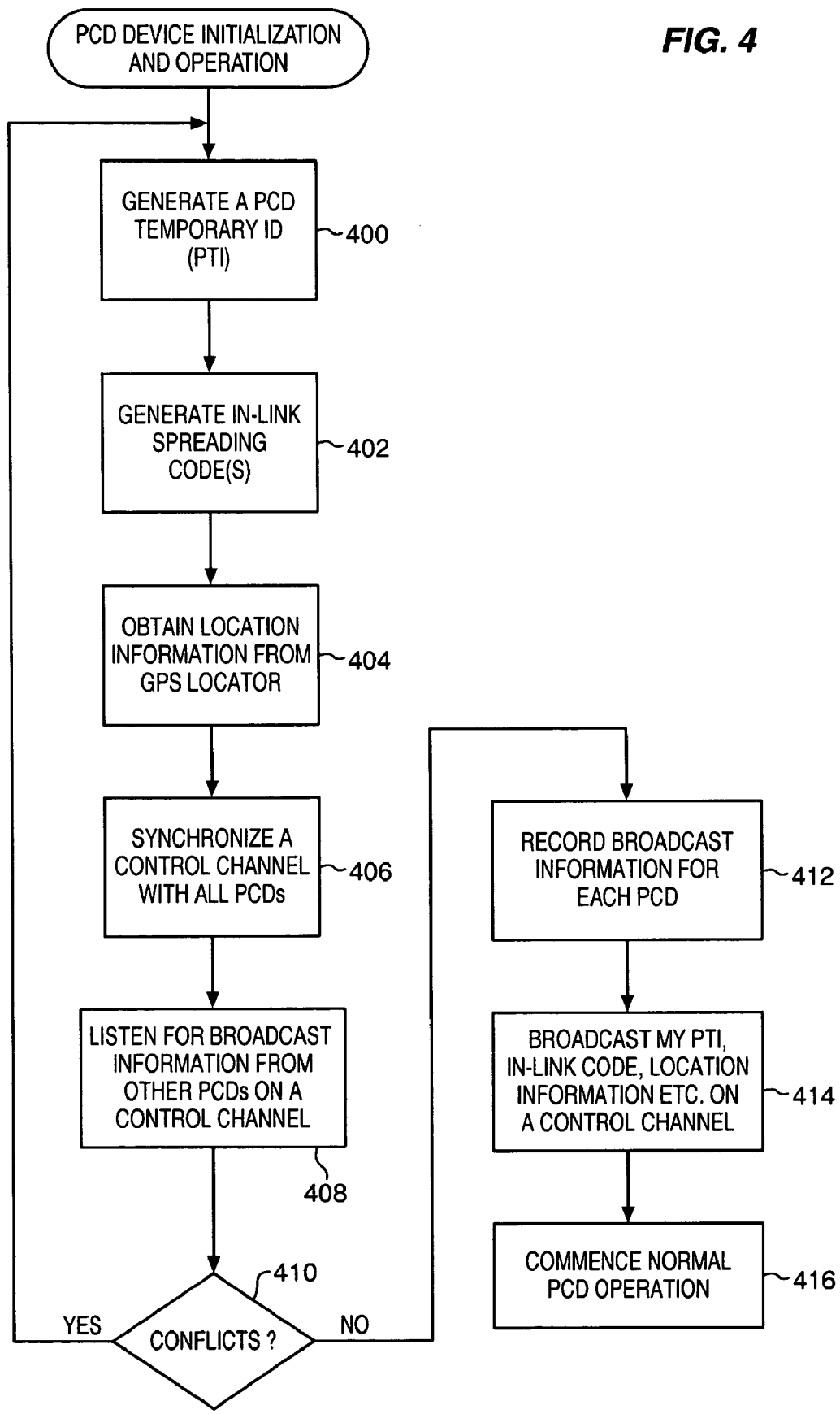
FIG. 4 is a flowchart describing exemplary methods operable in a proximity communication device as in FIG. 2 to initialize the device in accordance with features and aspects hereof.

FIG. 4 is a flowchart describing additional details of initialization of an individual PCD in the context of a proximity communication system. Element 400 is first operable to generate a unique PCD temporary ID ("PTI"). The PTI may be useful in protocols used for exchanging information between multiple PCDs. In particular, the PTI may be useful as an index to locate other information regarding a particular PCD from a table of entries regarding the system of PCDs. Element 402 then generates one or more In-Link spreading codes—a spreading code used first phase scrambling (as the term is defined in 3GPP standards). Channellization codes in accordance with 3GPP standards define a standard set of channels used by all communication devices in a system. Further source separation is achieved by second phase scrambling that separates the communication between pairs of communicating PCDs. Element 402 is therefore responsible for generating first phase scrambling codes for this PCD for communication over dedicated channels with this PCD. Alternatively, as noted herein below, source separation codes for a particular communicating pair of PCDs may be generated by processing associated with establishing the desired call connection.

Element 404 next interacts with the GPS element within the PCD to obtain location information regarding the initial location of the PCD. As is generally known in the art, GPS receivers receive information that identifies an absolute geographic location on the planet for the receiving device. The initial location of this PCD may therefore be an absolute location as determined by GPS receivers. Alternatively, the initial location may be determined as any other location coordinates including relative locations relative to some nearby fixed reference point. The initial location may therefore also be a relative location relative to some reference point. Such a relative location may be established by element 402 by any other means similar to that of GPS standards and protocols.

In order for all PCDs to exchange initial information in preparation for normal operation, all PCDs may be synchronized to utilize a common control channel available to each PCD (e.g., encoded with a spreading code known to all PCDs). At initialization, each PCD may synchronize its bitstream for that predefined control channel. Well known frame and slot level synchronization techniques as defined in the 3G standards may be applied to the PCD synchronization processing of step 406. In general, a synchronization channel ("SCH") is defined in the carrier transmission as an un-encoded predetermined bit sequence. Such synchronization techniques as defined in the 3G standards are common and well known in the context of cellular telephony. However, unlike cellular telephony, proximity communication systems in accordance with features and aspects hereof do not rely on a central server or cellular base station to provide the synchronization channel stream. Rather, in accordance with features and aspects hereof, each PCD during initialization listens to the defined synchronization channel to determine if any other PCD has begun transmitting the synchronization bit pattern. If not, the first PCD to achieve this level of initialization commences transmission of the standard synchronization bit pattern on the synchronization un-encoded channel. Each subsequent PCD proceeding through initialization will then detect another PCD already transmitting the synchronization sequence. Subsequent PCDs initializing may then synchronize to the first PCDs synchronization channel transmissions. Each PCD having so synchronized then joins in the transmission on the PCD SCH channel so that every initialized PCD is simultaneously transmitting the same synchronization bit pattern on the synchronization channel. Thus, any PCD may drop out of the proximity communication system without losing synchronization for all other remaining PCDs in the system. Alternatively, timing signals received from GPS satellites and therefore common to all PCDs in a proximity communication system may be used to synchronize broadcast communication channels as well as dedicated control and data channels.

With the PCD now synchronized to use a common control channel, element 408 is then operable to listen on a control channel for broadcast information from other PCDs in the proximity communication system. All PCDs may first listen for broadcast information for a period of time during initialization to obtain information about other PCDs in the communication system. As information broadcast from other PCDs is received, the information may be recorded in tables or memories associated with this PCD for later use.

After a period of time listening for broadcast information from other PCDs, element 410 will determine whether any conflicts are detected in the generated initial information for this PCD and that of any other PCD received in the broadcast information. Conflicts may be detected in the PTI value (ID value) generated for this device or may be found in the spreading codes generated for use in transmissions to this PCD. If element 410 detects a conflict in this initial information, processing loops back to element generate new PTI and spreading codes and them listen again to detect any new possible conflicts.

When element 410 detects no conflict, element 412 broadcasts the initial information for this PCD on a common control channel—i.e., a logical broadcast channel defined in the spread spectrum transmissions and shared by all PCDs to exchange such information. The broadcast information may include the PTI and the In_Link spreading codes generated for the initializing PCD as well as initial location information derived from the GPS component of the PCD. Element 414 then commences normal operation of the PCD having completed initialization. Normal operation may continue periodic broadcasts of the updated current location information as well as the initial PTI and spreading codes generated above. Further details of exemplary normal operation are provided herein below with respect to FIG. 5.

FIG. 10 is a flowchart describing additional details of the processing of element 406 of FIG. 4 to establish synchronization among the plurality of PCDs in the system. Element 1000 first determines whether any other PCD has already started transmitting the synchronization bit sequence on the synchronization channel. If not, there is no signal to synchronize to yet, this PCD is the first to get this far in initialization. Element 1006 is next operable to start transmitting the synchronization bit sequence to allow other PCDs to synchronize to this transmission. If element 1000 determines that another PCD has already started transmitting the synchronization pattern, then element 1002 and 1004 are operable to sample the transmitted stream on the synchronization channel and to synchronize to the detected sequence. Having so synchronized, the PCD then starts transmitting the same synchronization bit pattern on the synchronization channel in synchronization with all other PCDs having completed this level of initialization. Since all PCDs in the system will be transmitting the same synchronization signal, loss of any one PCD will not prohibit continued operation of the system by losing synchronization or precluding addition of other PCDs.

FIG. 11 is a flowchart describing another technique for synchronizing the transmissions of all PCDs. A GPS locator device may be incorporated in each PCD as noted above. GPS signaling standards provide that a vast array of satellites provide a number of signals to terrestrial based receivers. Principally these signals are used to identify the absolute location of the receiver on the surface of the Earth (i.e., longitude and latitude). In addition, certain signals provide a globally synchronized clock signal. This clock signal may be used by each PCD to synchronize transmissions. For example, each PCD may synchronize to a signal starting at each full second increment of the clock or at other particular mutually agreed upon markers in the clock signals. Element 1100 of FIG. 11 therefore describes additional details of such an alternative embodiment of element 406 of FIG. 4 above. Element 1100 represents processing to synchronize the transmissions of this PCD to the GPS clock signals received by the GPS locator portion of the PCD.

Figure 5:
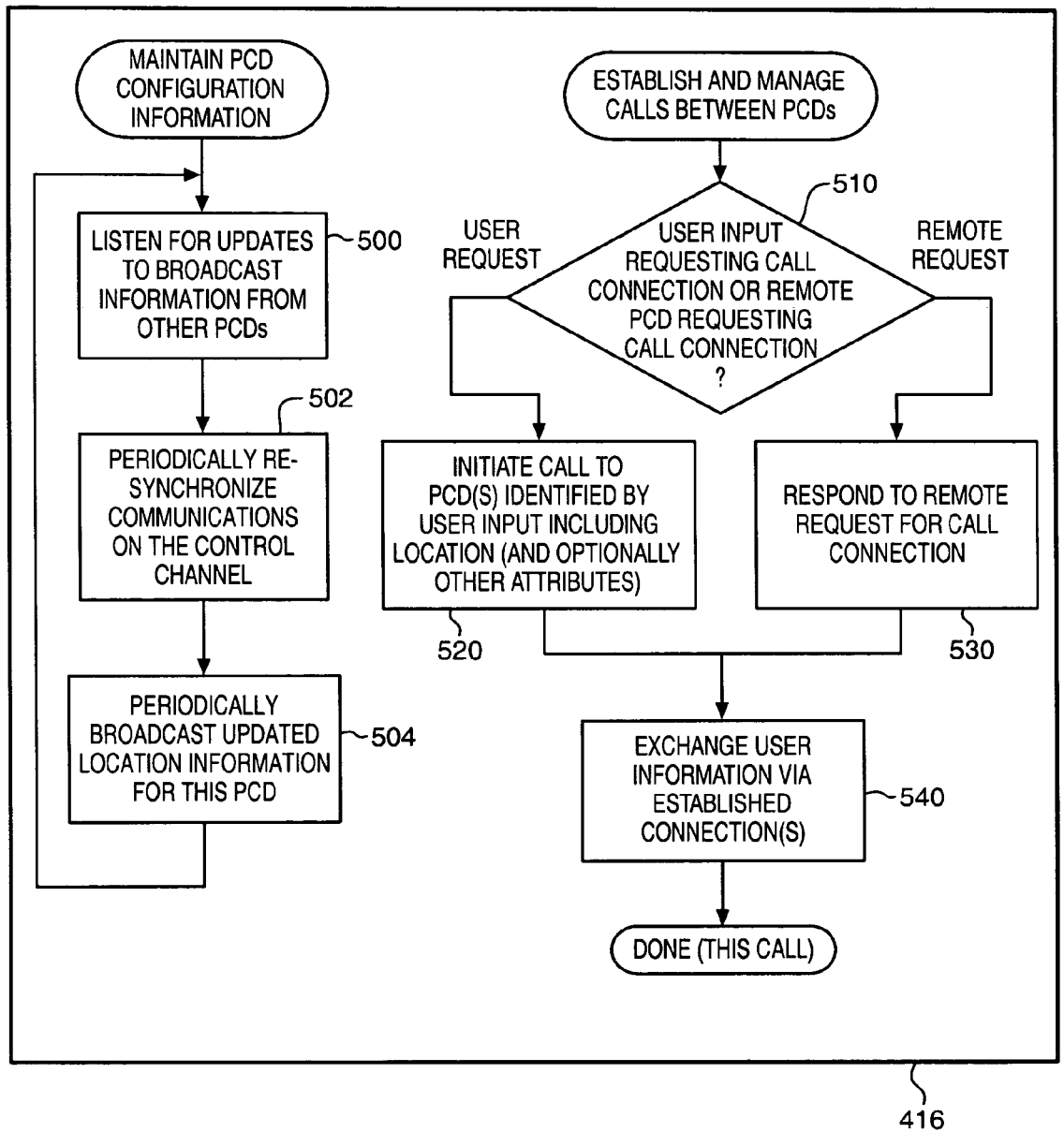
FIG. 5 is a flowchart describing exemplary methods operable in a proximity communication device as in FIG. 2 to normally operate the device to update information in the system and to establish call connections in accordance with features and aspects hereof.

FIG. 5 describes two methods operable substantially in parallel and in combination representing exemplary normal operation of a PCD following completion of initialization. A first method represented by elements 500 through 504 maintains synchronization for communication on the control channel and also updates broadcast information ("UBI") regarding location and other parameters associated with each PCD in the proximity communication system. A second method in FIG. 5 operable substantially in parallel with the first method is represented as elements 510 through 540 to allow establishment of call connections between this PCD and one or more other PCDs in the proximity communication system.

Elements of 500 through 504 represent a method operable in an initialized PCD to maintain synchronization and to update exchanged broadcast information on a control channel shared by all PCDs in the proximity communication system. Element 500 is operable to listen for updates to the broadcast information from other PCDs. As noted, new PCDs may join the proximity communication system from time to time. Element 500 is therefore operable to listen to the control channel for such broadcast information regarding new PCDs and to detect the absence of broadcast information from PCDs previously participating in the proximity communication system. As information is derived from listening for broadcast updates by element 500, tables within the PCD are updated to reflect the updated broadcast information. Element 502 is then operable to periodically re-synchronize communications on the control channel. As noted above, in a proximity communication system in accordance with features and aspects hereof, there is no central server or cellular base station to maintain synchronization for all communication devices. Rather, all PCDs participating in the proximity communication system continuously transmit the synchronization pattern on a synchronization channel of the proximity communication system. Thus, as new PCDs are added to the communication system and undergo initialization, it is assured that there is always at least one PCD already participating in the proximity communications system assured to be generating the necessary synchronization pattern to permit initialization of the new PCD device. Element 504 is then operable to periodically broadcast updated location and other information from this PCD to all other PCDs and the proximity communication system. The broadcast information is transmitted on a control channel so that other PCDs listening for such updated broadcast information may receive the information on the control channel. Processing then continues looping back to element 500 to continuously iterate through listening for updated information, maintaining synchronization on the control channel, and periodically updating location and other information regarding this PCD.

Substantially in parallel with the method described above, elements 510 through 540 are operable to manage the call connection process. Element 510 is first operable in response to detecting some event requesting establishment of a new call connection between this PCD and one or more other PCDs. Element 510 determines whether the detected event is a request from a user of this PCD to make a call connection with one or more other PCDs or whether the detected event is a request from a remote PCD attempting to establish a call connection with this PCD. If the request is a user request, element 520 is operable to initiate a call connection process to the PCD identified by the user input based upon location information and optionally identified by other attributes of the identified PCD. As noted above, user input to request such a call connection may typically be in the form of selecting a PCD based upon location information associated with each PCD in the proximity communication system. Other attributes such as capabilities or features associated with the PCD, a username or other identification associated with the user of the PCD, etc., may be included as other selection criteria in the user's selection process. Further, the user may select multiple PCDs with which a call connection is to be established. Multiple selected PCDs may receive identical data transmissions (voice or non-voice data) from this PCD by a multicast or duplicate transmission to each of the multiple selected PCDs.

Further, those of ordinary skill in the art will recognize that dedicated logical channels used to communicate between this PCD and one or more selected PCDs may be established by generating scrambling codes in element 520 at the time of selecting the PCDs with which to communicate. Regardless of when the scrambling codes are defined, the codes are exchanged between the PCDs to be connected in a call and define the logical channels to be used for each communicating pair of PCDs. Various well known security techniques may be employed to secure each logical channel from eavesdropping by other PCDs not involved in communication between the corresponding connected pair of PCDs.

Once element 520 has completed establishing the requested call connection to one or more other identified PCDs, element 540 is then operable to exchange user data via the established connections. Communication with multiple PCDs may involve duplicating the transmitted data to each of the multiple PCDs connected to this PCD by operation of element 520. When element 540 has completed its exchange of user information or data, a final message may be sent to all PCDs involved in the established connection or connections to request tearing down of the establish connection. Tearing down an establish connection entails freeing the various private communication channels established by operation of element 520.

If element 510 determines that the detected event is a request from a remote PCD to establish the call connection with that remote PCD, element 530 is operable to appropriately respond to the remote request for a call connection. Having thus established the requested call connection, element 540 is then operable as discussed above to commence exchange of user information or data via the established logical channels of the connection. As noted above, upon completion of all user data exchange, a final tear down message may be sent to the logical channel to release logical channels and other resources consumed or defined by establishment of the channel connection.

Figure 6:
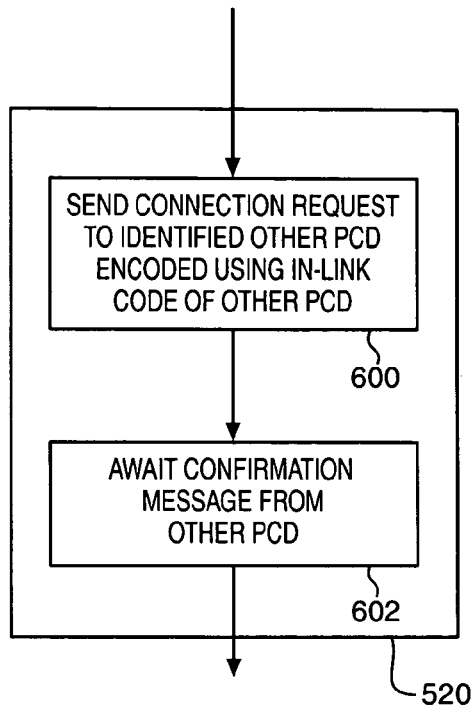
FIG. 6 is a flowchart providing additional details of an exemplary call management and processing protocol in accordance with features and aspects hereof.
Figure 7:
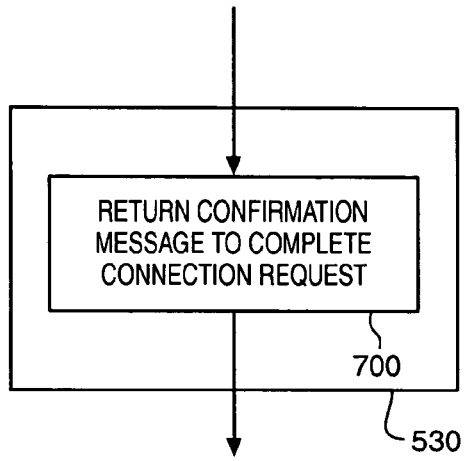
FIG. 7 is a flowchart providing additional details of an exemplary call management and processing protocol in accordance with features and aspects hereof.
Figure 8:
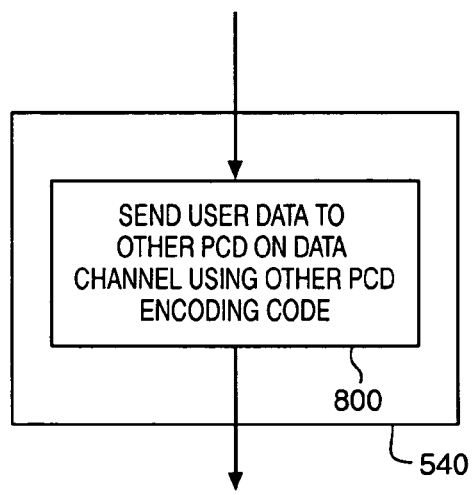
FIG. 8 is a flowchart providing additional details of an exemplary data exchange in an established call in accordance with features and aspects hereof.

FIGS. 6, 7, and 8 provide additional details regarding the operation of elements 520, 530, and 540, respectively. FIG. 6 provides additional details regarding the operation of element 520 (of FIG. 5). Element 600 is first operable to send a connection request to the one or more identified other PCDs. The connection request message is encoded using the In_Link spreading code of the other PCD. The In_Link code from the other PCD may be determined based upon the table of information stored within this PCD and gathered from the broadcast information during initialization of PCDs in the proximity communication system. As noted above, if multiple PCDs are identified for establishing call connections, element 600 transmits a connection request to each such PCD to request a connection with each other identified PCD. Element 602 then awaits receipt of a confirmation message from each other PCD to which a request was sent indicating acceptance and successful completion of establishment of the requested call connection.

FIG. 7 is a flowchart describing additional details of the operation of element 530 of FIG. 5. Element 700 is operable to return a confirmation/acknowledgment message to the requesting PCD indicating successful completion of the connection request. Having so successfully completed the connection request, the first and second PCDs may commence exchange of user data as described above.

FIG. 8 is a flowchart describing additional details of the operation of element 540 of FIG. 5. Element 800 is first operable to send user data to another PCD having a data channel established in response to the request and confirmation return messages in FIGS. 6 and 7 above. The exchange of user data by element 800 is performed on a data channel associated with the initiating PCD. The scrambling codes generated and exchanged between the communicating PCDs are used to encode the transmissions to each PCD. Where multiple call connections are requested and established, element 800 represents the exchange of data duplicated over multiple dedicated channels between the various multiple pairs of connected PCD pairs. Further, as noted above, upon completion of the exchange of user data, element 800 may also operate to transmit a tear down message to the PCDs involved in established connections. The tear down message is processed by each receiving PCD by the deallocating resources allocated for the call connection.

The processing of FIGS. 6-8 represent a simplified call processing message protocol to establish and terminate a call connection between two PCDs. Those of ordinary skill in the art will recognize that any suitable call processing messaging protocol may be employed in the proximity communication system hereof. A call processing protocol provides a number of messages for establishing and destroying a call connection between a PCD and one or more other PCDs. For example, standard cellular telephony call processing protocols as well as standards published by 3GPP provide such call processing messaging protocols. Though these standard call processing protocols are rich with features not needed in the proximity communication features and aspects hereof, simplified subsets of these standard protocols may be used to provide useful call connection processing features and aspects hereof. As a matter of design choice, these standard protocols may be used or modified or a customized protocol structure may be developed.

3GPP and other telecommunication standards define a number of logical and physical channels useful in the call processing protocols. Several of these standard channel definitions may be useful in the proximity communication features and aspects hereof. The following 3GPP standard logical and physical channels are exemplary of channels that may be useful in implementing call processing protocol exchanges in accordance with features and aspects hereof:

Channel Usage
BCH Broadcast Channel
CCCH Common Control Channel
DCCH Dedicated Control Channel
DCH Dedicated Channel
DPCCH Dedicated Physical Control Channel
DPCH Dedicated Physical Channel
DPDCH Dedicated Physical Data Channel
DTCH Dedicated Traffic Channel
PCCPCH Primary Common Control Physical Channel
SCCPCH Secondary Common Control Physical Channel
SCH Synchronization Channel In general, a control channel is used to exchange commands and control information between two PCDs while a data or traffic channel is used to exchange application or user data (i.e., voice data and non-voice data in the proximity communication system). Control and other standard channels may be encoded using channellization codes as generally defined by 3GPP and other standards. In general, dedicated channels are encoded using the source separation or scrambling code associated with the receiving PCD in a requested or established connection. Non-dedicated channels utilize a channelization code known to all PCDs of the system and may thus be shared by all PCDs. The synchronization channel (SCH) and broadcast channel (BCH) are examples of unencoded non-dedicated channels shared by all PCDs in the proximity communication system hereof. The SCH may be used for a periodic transmission of a standard synchronization bit pattern. The BCH channel may be used to broadcast location and other information about each PCD for consumption by all PCDs in the proximity communication system. The traffic channel (DTCH) may be used by PCDs after establishment of a connection to exchange user data. The common control channel (CCCH) may be a channel shared by all PCDs in the system for, among other things, transmitting a call connection request message. The dedicated control channel (DCCH) may be used in establishing a connection for control messages following the transmission on CCCH of the connect request.

Figure 9:
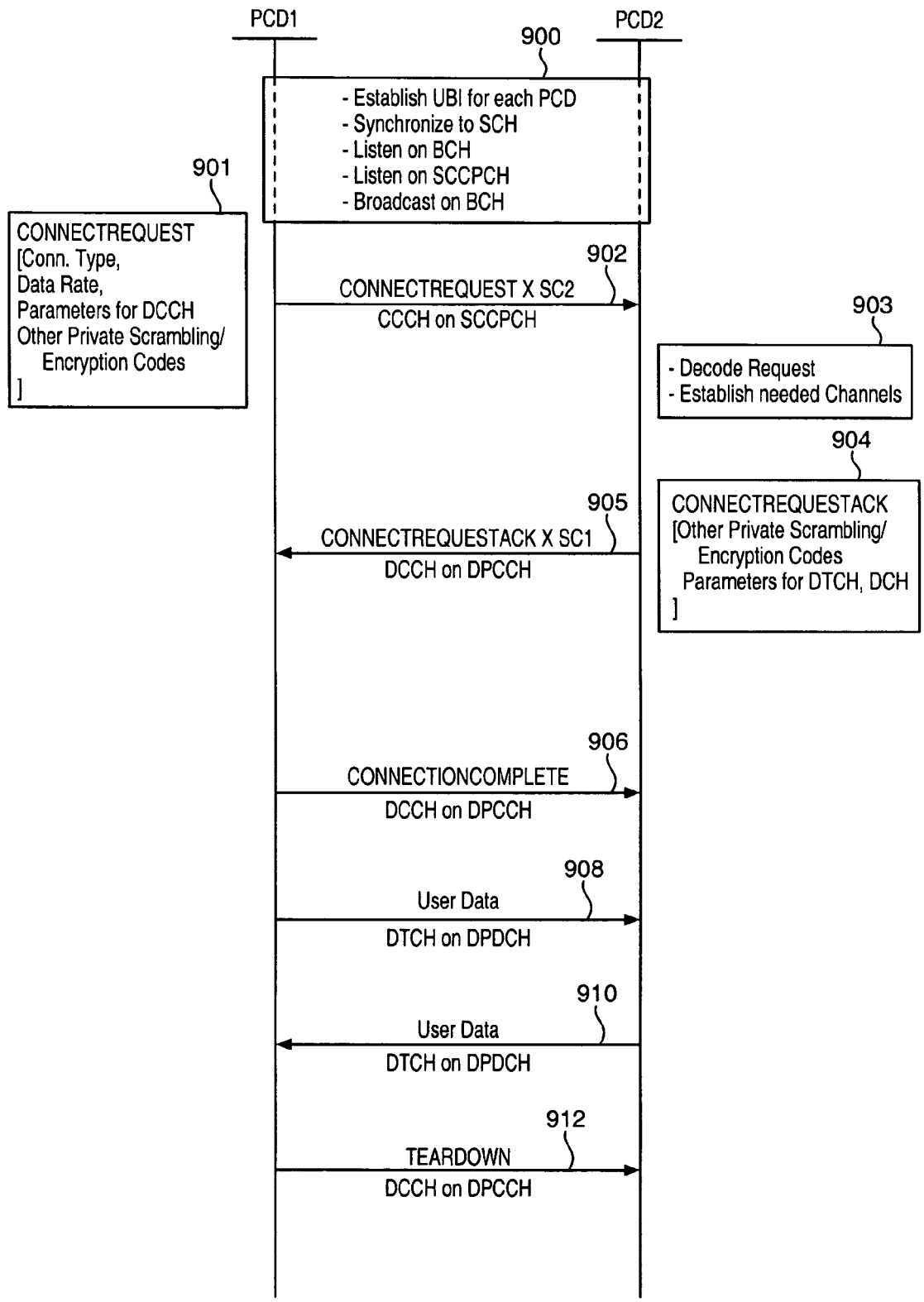
FIG. 9 is a timeline diagram describing an exemplary call management and data exchange process between two proximity communication devices in accordance with features and aspects hereof.

FIG. 9 is a diagram providing another form of description of an exemplary protocol defined for the proximity communication system in accordance with features and aspects hereof. FIG. 9 represents a timeline presentation of PCD initialization, call connection establishment, and data exchange through an established connection. In the timeline diagram of FIG. 9, time is advancing downward in the FIG. A vertical line labeled PCD1 represents processing associated with the PCD desiring to initiate the call connection while the vertical line labeled PCD2 represents processing associated with the recipient of a connection request. Box 900 represents processing performed by both PCDs (all PCDs) of a proximity communication system. All PCDs in a proximity communication system initialize themselves by first establishing the device specific broadcast information (UBI) for its configuration. As noted above, the UBI may include the first phase scrambling code used for communicating with this PCD as well as location information indicating that initial location of the corresponding PCD and other attributes and indicia useful in selecting a PCD to establish a call connection.

Having completed initialization, box 901 represents a connect request message structure generated by processing within PCD1. A connection request message may include a number of parameters including a connection type (e.g., voice, non-voice, or both), a data rate indicator to allow a receiving PCD to determine whether it has capacity to handle the requested connection, etc. The connection request parameters may also include miscellaneous other parameters for a dedicated control and/or data channel to be utilized by the requested call connection. Lastly, the connection request includes the second phase code (i.e., a scrambling code) used to encode data to be transmitted to this PCD1. Arrow 902 represents transmission of the formatted connect request over the common control logical channel (CCCH) applied to the secondary common control physical channel (SCCPCH). This message may be encoded/scrambled with the phase 1 scrambling code of PCD2 that was broadcast as part its UBI.

Box 903 represents receipt and processing of the connection request within PCD2. The PCD2 transceiver decodes the received message as required. PCD2 then establishes the necessary logical channels for communications with PCD1 in accordance with the parameters received in the connection request. Typically, a number of dedicated logical and physical channels may be configured to permit the intended communication between PCD1 and PCD2. In particular, a dedicated control channel (DCCH) and a dedicated traffic channel (DTCH) may be created to allow transfer of control information and user data, respectively, between PCD1 and PCD2. These logical dedicated logical channels may be formed by applying the second phase scrambling code in accordance with 3GPP specifications. In addition, a dedicated physical control channel (DPCCH) and a dedicated physical data channel (DPDCH) may be created for the spread spectrum modulation of control and user data, respectively, between PCD1 and PCD2.

Box 904 represents construction of a connect request acknowledgment message to be sent from PCD2 back to PCD1 acknowledging its readiness for exchange of data. Parameters of the connect request acknowledge message may include the second phase code desired for communications to PCD2 and other parameters for the dedicated logical channels created by PCD2. Arrow 905 represents transmission of the connect requested acknowledge message from PCD2 to PCD1 using the newly created dedicated control channel. Arrow 906 represents receipt of a simple message from PCD1 to PCD2 indicating its handshake completion of initialization and therefore, PCD1's readiness to exchange data on the established logical and physical channels. This message may be encoded/scrambled with the phase 1 scrambling code of PCD1 that was broadcast as part its UBI. Alternatively, the returned confirmation message may be encoded using the $2^{nd}$ phase scramble code for PCD1 rather than the phase 1 scrambling code.

Arrows 908 and 910 represent exchange in each direction of user data utilizing the dedicated data channel created for the established connection. These data transmissions may be encoded using the second phase scrambling code of one of the connected PCDs (i.e., PCD1 or PCD2). When the initiator of the call connection (PCD1) recognizes completion of the desired exchange, arrow 912 represents the transmission of a tear down message using the dedicated control channel to permit PCD2 to release allocated resources and prepare for another connection.

Those of ordinary skill in the art will recognize that the exemplary, simplified call connection protocol discussed above with respect to FIGS. 5 through 11 are merely intended as suggestive of one possible protocol useful in the proximity communication system providing features and aspects hereof. Numerous equivalent protocols may be designed as a matter of design choice or existing call processing protocols such as cellular telephony call processing protocols may be utilized. However, extraneous additional features in the cellular telephony call processing protocol not required for this simpler application may simply be ignored and a small subset of standardized call processing messages can be utilized. Alternatively, a larger, richer subset of call processing features may be adopted in the proximity communication system to permit further enhanced features. Further, those of ordinary skill in the art will recognize that any suitable collection of logical and physical channels may be defined for the connection between any two PCDs.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. In particular, those of ordinary skill in the art will readily recognize that features and aspects hereof may be implemented equivalently in electronic circuits or as suitably programmed instructions of a general or special purpose processor. Such equivalency of circuit and programming designs is well known to those skilled in the art as a matter of design choice. As a result, the invention is not limited to the specific examples and illustrations discussed above, but only by the following claims and their equivalents.

We claim:

1. A system for proximity communication comprising:
 a plurality of proximity communication devices ("PCDs") wherein each PCD comprises:
 a locator to determine the geographic location of said each PCD;
 a wireless transceiver for exchanging information in one or more peer-to-peer connections between said each PCD with other PCDs wherein the information exchanged includes location of each of said plurality of PCDs and wherein the information exchanged further includes user data; and
 a display for presenting information relating to location of said other PCDs relative to said each PCD,
 wherein said each PCD is adapted to establish a peer-to-peer connection with an identified PCD of said other PCDs wherein said peer-to-peer connection is a digital connection that establishes synchronization and digital channels by operation of the PCDs connected by the peer-to-peer connection, and
 wherein the identified PCD is selected by said each PCD based on the location of said identified PCD as displayed on said each PCD.

2. The system of claim 1 wherein the locator is a Global Positioning System (GPS) locator.

3. The system of claim 1 wherein the location is an absolute location including longitude and latitude.

4. The system of claim 1 wherein the location is a relative location locating said each PCD relative to a reference point.

5. The system of claim 1 wherein the location is dynamic and wherein the current location of each PCD is periodically exchanged among all the PCDs.

6. The system of claim 1 wherein the location is used by said each PCD to determine the relative proximity of each PCD to each other PCD of the plurality of PCDs and wherein said each PCD is further adapted to establish a connection with one or more identified PCDs based on the relative proximity of said each PCD to said each other PCD.

7. The system of claim 1 wherein the exchanged information includes attributes of each of said other PCDs and wherein said each PCD is further adapted to establish a connection with said identified PCD based on the attributes of said identified PCD.

8. The system of claim 1 wherein the user data includes voice data and non-voice data.

9. The system of claim 1 wherein at least one PCD of the plurality of PCDs further includes:
 a wireless telephonic transceiver to provide connectivity to a telephone network in addition to connectivity among said plurality of PCDs.

10. The system of claim 9 wherein the telephone network is a cellular telephone network.

11. A method for proximity based communication comprising:
 synchronizing wireless communication among a plurality of proximity communication devices ("PCDs") wherein the step of synchronizing establishes bit-level synchronization for decoding encoded digital information exchanged between the plurality of PCDs;

generating a first unique code associated with each of the plurality of PCDs;

determining the initial location associated with each of the plurality of PCDs;

broadcasting the first unique code and the initial location associated with each of the plurality of PCDs from each PCD to all other PCDs; and establishing at least one call connection between a first PCD and a second PCD based upon the initial location information exchanged between the first PCD and the second PCD, wherein said call connection is a peer-to-peer digital connection that establishes synchronization and digital channels by operation of the first and second PCDs connected by the peer-to-peer digital connection.

12. The method of claim 11 further comprising:
periodically resynchronizing the wireless communication among the plurality of PCDs.

13. The method of claim 11 further comprising:
periodically determining a current location associated with each of the plurality of PCDs; and
broadcasting the current location associated with each PCD from each PCD to all other PCDs.

14. The method of claim 13 wherein the step of establishing further comprises:
establishing at least one call connection from the first PCD to the second PCD based upon the initial location information or based upon the current location information exchanged between the first PCD and the second PCD.

15. The method of claim 14 wherein the step of establishing further comprises:
selecting the second PCD within the first PCD based upon the initial location information or based upon the current location information;
sending a connection request from the first PCD to the second PCD wherein the connection request is encoded using the first unique code associated with the second PCD and wherein the connection request includes parameters of the desired connection;
receiving the connection request within the second PCD; and
establishing the requested connection in accordance with the parameters included in the received connection request.

16. The method of claim 15 further comprising:
responsive to establishment of the requested connection, exchanging scrambled information between the first PCD and the second PCD where the scrambled information is encoded using scrambling key information exchanged between the first PCD and the second PCD in establishing the requested connection.

17. The method of claim 16 further comprising:
generating a PCD ID for each PCD; and
generating said scrambling key information,
wherein the step of broadcasting further comprises:
broadcasting the PCD ID and scrambling key information for each PCD from said each PCD to all other PCDs.

18. The method of claim 17 further comprising:
verifying the uniqueness of each PCD ID received in each PCD in response to the broadcasting; and
responsive to detecting a non-unique PCD ID by operation of the step of verifying, performing the steps of:
regenerating an alternate PCD ID associated with the particular PCD that detected the non-unique PCD ID; and
re-broadcasting the alternate PCD ID for the particular PCD from the particular PCD to all other PCDs.

19. The method of claim 11 wherein the step of establishing further comprises:
establishing multiple call connections between a first PCD and multiple other PCDs,
wherein the method further comprises:
responsive to establishment of the multiple call connections, duplicating the exchange of information between the first PCD and any one of the multiple other PCDs to exchange the same information between the first PCD and each of the multiple PCDs,
wherein each of the multiple call connections is encoded using a distinct scrambling code.

20. In a proximity communication device ("PCD") having a GPS locator device and having a wireless transceiver and having a user interface element to interact with a user, a method comprising:
receiving location information from other PCDs using the wireless transceiver;
presenting the received location information to a user on the user interface element;
receiving user input from the user interface element to indicate one or more other PCDs selected by the user based upon the presented location information;
establishing a call connection with each of the one or more other PCDs using the wireless transceiver wherein each said call connection is a peer-to-peer digital connection that establishes synchronization and digital channels by operation of the PCDs connected by the peer-to-peer digital connection; and
exchanging substantially the same information with each of the one or more other PCDs using the wireless transceiver.

* * * * *

UNITED STATES PATENT AND TRADEMARK OFFICE
CERTIFICATE OF CORRECTION

PATENT NO.       : 7,647,022 B2                                                 Page 1 of 1
APPLICATION NO.  : 10/953740
DATED            : January 12, 2010
INVENTOR(S)      : Ng It is certified that error appears in the above-identified patent and that said Letters Patent is hereby corrected as shown below:

In column 6, line 28, the text "modem cellular" should read "modern cellular".

Signed and Sealed this

Twenty-sixth Day of October, 2010

David J. Kappos
*Director of the United States Patent and Trademark Office*

UNITED STATES PATENT AND TRADEMARK OFFICE
CERTIFICATE OF CORRECTION

PATENT NO. : 7,647,022 B2  
APPLICATION NO. : 10/953740  
DATED : January 12, 2010  
INVENTOR(S) : Ng et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 880 days.

Signed and Sealed this

Sixteenth Day of November, 2010

David J. Kappos  
*Director of the United States Patent and Trademark Office*